(12) United States Patent
Krebs et al.

(10) Patent No.: US 10,166,926 B2
(45) Date of Patent: Jan. 1, 2019

(54) AUTOMATICALLY DIMMABLE REAR-VIEW MIRROR ARRANGEMENT FOR MOTOR VEHICLES AND METHOD FOR PRODUCING A MIRROR ASSEMBLY FOR A REAR-VIEW MIRROR ARRANGEMENT

(71) Applicant: Magna Mirrors Holding GmbH, Sailauf (DE)

(72) Inventors: Peter Krebs, Mömb, DE (US); Hans-Joachim Fuchs, Dorfprozelten (DE); Phillip March, Goldkronach (DE)

(73) Assignee: MAGNA Mirrors Holding GmbH, Sailauf (DE)

( * ) Notice: Subject to any disclaimer, the term of this patent is extended or adjusted under 35 U.S.C. 154(b) by 0 days.

(21) Appl. No.: 14/440,485

(22) PCT Filed: Oct. 16, 2013

(86) PCT No.: PCT/DE2013/200229
§ 371 (c)(1),
(2) Date: May 4, 2015

(87) PCT Pub. No.: WO2014/071937
PCT Pub. Date: May 15, 2014

(65) Prior Publication Data
US 2015/0283945 A1     Oct. 8, 2015

(30) Foreign Application Priority Data

Nov. 6, 2012   (DE) ........................ 10 2012 220 192

(51) Int. Cl.
| | |
|---|---|
| *G02F 1/1335* | (2006.01) |
| *B60R 1/08* | (2006.01) |
| *G02F 1/1337* | (2006.01) |
| *G02F 1/1343* | (2006.01) |

(52) U.S. Cl.
CPC ............ *B60R 1/088* (2013.01); *G02F 1/1337* (2013.01); *G02F 1/13439* (2013.01); *Y10T 29/49155* (2015.01)

(58) Field of Classification Search
None
See application file for complete search history.

(56) References Cited

U.S. PATENT DOCUMENTS 4,729,638 A    3/1988  Shirai
5,851,605 A *  12/1998 Hisamitsu ............ G02F 1/1339
                                                            349/155

(Continued)

*Primary Examiner* — Richard H Kim
(74) *Attorney, Agent, or Firm* — Jordan IP Law, LLC; Todd A. Vaughn

(57) ABSTRACT

A rear-view mirror arrangement for motor vehicles that includes a housing and a mirror assembly arranged thereon and which is to observe following traffic. The mirror assembly has a front side and a rear side, in which a reflectance thereof that it is variable by a control device. The mirror assembly has an electrically drivable liquid crystal cell arranged between transparent carrier layers, and at least one reflection coating. One of the transparent carrier layers which faces toward the housing on the rear side is an optically transparent plastic film that is provided with the reflection coating on the rear side.

16 Claims, 2 Drawing Sheets

(56) References Cited

U.S. PATENT DOCUMENTS

| | | | |
|---|---|---|---|
| 2002/0126229 A1* | 9/2002 | Niiyama | G02F 1/13473 349/35 |
| 2002/0140884 A1 | 10/2002 | Richard | |
| 2006/0267016 A1* | 11/2006 | Ahn | G02F 1/133555 257/59 |
| 2007/0206263 A1* | 9/2007 | Neuman | B60R 1/088 359/267 |
| 2012/0026571 A1* | 2/2012 | Uken | B60R 1/088 359/267 |
| 2012/0236388 A1* | 9/2012 | De Wind | B60R 1/04 359/267 |
| 2013/0170013 A1* | 7/2013 | Tonar | B60R 1/088 359/296 |

\* cited by examiner

AUTOMATICALLY DIMMABLE REAR-VIEW MIRROR ARRANGEMENT FOR MOTOR VEHICLES AND METHOD FOR PRODUCING A MIRROR ASSEMBLY FOR A REAR-VIEW MIRROR ARRANGEMENT

CROSS-REFERENCE TO RELATED APPLICATIONS

The present application is a National Stage Application of PCT International Application No. PCT/DE2013/200229 (filed on Oct. 16, 2013), under 35 U.S.C. § 371, which claims priority to German Patent Application No. 10 2012 220 192.0 (filed on Nov. 6, 2012), which are each hereby incorporated by reference in their respective entireties.

FIELD OF INVENTION

The present invention relates to an automatically dimmable rear-view mirror arrangement for motor vehicles and to a method for producing a mirror assembly for a rear-view mirror arrangement.

BACKGROUND

Rear-view mirror arrangements for motor vehicles have a reflective surface that enables the traffic at the rear to be observed. The rear-view mirror arrangements are usually embodied such that they are additionally dimmable. During travel in darkness, this prevents dazzle arising from vehicles following behind. In the case of automatically dimmable rear-view mirror arrangements, light sensors arranged in the mirror housing measure or detect the difference in brightness between automobile front zone and rear traffic area. The measurement values are then forwarded to evaluation and control electronics and the reflectivity of the mirror arrangement is correspondingly varied. Both electrochromic rear-view mirror arrangements composed of an electrochromic material and rear-view mirror arrangements which comprise a liquid crystal layer are known in this case. In both systems, the reflectivity is variable when an electric field is applied.

The so-called electrochromic (EC) rear-view mirror arrangements have the disadvantage that this technology has a high current consumption, and that the variation of the reflectivity is very slow.

However, the known rear-view mirror arrangements comprising a liquid crystal layer (LC) also have some disadvantages. Both the known EC mirror arrangements and the previously known LC mirror arrangements substantially consist of a transparent glass pane facing the viewing side, a so-called EC and LC cell, respectively, situated behind the latter, and a lower terminating glass layer provided with a reflective coating. During production, in this case, the two glass layers have to be aligned and arranged exactly parallel to and spaced apart from one another. The manufacturing costs are very high particularly in the embodiment of rear-view mirror arrangements having a curved surface configuration. In this case, the glasses are embodied in a correspondingly curved fashion by bending, wherein two glasses have to match one another exactly with regard to their curvature. If the glasses arranged parallel to and spaced apart from one another deviate from one another with regard to their curvature, undesirable double images occur during the use of the rear-view mirror arrangement. The production and selection of the glass panes matching one another with regard to their curvature is therefore complex and expensive.

An LC mirror arrangement having the basic construction described above is known for example from German Patent Publication No. DE 10 2009 020 402 A1 and German Patent Publication No. DE 196 31 409 A1.

SUMMARY

Therefore, it is an object of the present invention to develop an automatically dimmable rear-view mirror arrangement for a motor vehicle comprising a liquid crystalline layer in such a way that the rear-view mirror arrangement has a low weight, a low current consumption, and the reflectivity is varied very rapidly.

Furthermore, the object from the standpoint of a further aspect of the invention consists in specifying a method for producing a mirror assembly whereby the mirror assembly can be produced cost-effectively.

From the standpoint of a first aspect, this object is achieved by way of the features specified in the claimed invention, which include generally a rear-view mirror arrangement for motor vehicles, comprising a housing and a mirror assembly arranged thereon and having a front side and a rear side for observing following traffic, the mirror assembly having a reflectance that it is variable by a control device. The mirror assembly comprises two transparent carrier layers, at least one reflection coating, and an electrically drivable liquid crystal cell arranged between the transparent carrier layers. The liquid crystal cell has a liquid crystalline layer (LC) arranged in a sealed fashion between two transparent electrically conductive layers and a transparent alignment layer provided between the electrically conductive layers and the liquid crystalline layer. The alignment layer is to bring about an alignment of the liquid crystal molecules. The transparent carrier layer facing toward the housing on a rear side of the rear-view mirror arrangement is arranged adjacent to the electrically conductive layer, and comprises an optically transparent plastic film provided with the reflection coating on a rear side thereof.

From the standpoint of a further aspect, the object is achieved by way of the features specified in the claimed invention, which include generally a method for producing a mirror assembly for a rear-view mirror arrangement (as set forth herein), the method including (i.) producing a first assembly by providing a transparent carrier layer composed of glass or plastic, coating the transparent carrier layer with a first electrically conductive layer, and arranging a first alignment layer on the first electrically conductive layer; (ii.) producing a second assembly by providing a transparent thermoplastic film as a carrier layer, coating the carrier layer with a second electrically conductive layer, and arranging a second alignment layer on the second electrically conductive layer; (iii.) arranging, in a circumferential fashion, a seal to the coated surface of the first or second assembly, and also a liquid crystalline layer (LC) within the sealed region; and then (iv.) connecting the first and second assemblies under vacuum to form the mirror assembly.

By way of the construction of the mirror assembly in accordance with the claimed invention, wherein a transparent carrier layer facing toward the housing side is embodied as an optically transparent plastic film comprising a reflection layer, a rear-view mirror arrangement significantly reduced in weight can be implemented. Owing to the use of a mirror assembly comprising an electrically drivable liquid crystal cell, the reflection behavior can be varied very rapidly, a low energy consumption additionally being present.

The production costs can be considerably reduced since the film can be adapted with regard to curvature to the transparent carrier layer facing the front side, i.e., the cover layer of the mirror assembly composed of a glass layer. Double images and optical distortions for the vehicle user are avoided on account of this ideal adaptation of the film to the glass layer.

In a further embodiment of the rear-view mirror arrangement according to the invention, provision is made for the mirror assembly to be fixed to the housing in a frameless fashion.

Further advantageous configurations and developments of the rear-view mirror arrangement according to the invention are evident from the dependent claims.

DRAWINGS

Preferred embodiments of the rear-view mirror arrangement for a motor vehicle are described by way of example below, wherein reference is made illustratively to the accompanying drawings. In the figures.

DESCRIPTION

Figure 1:
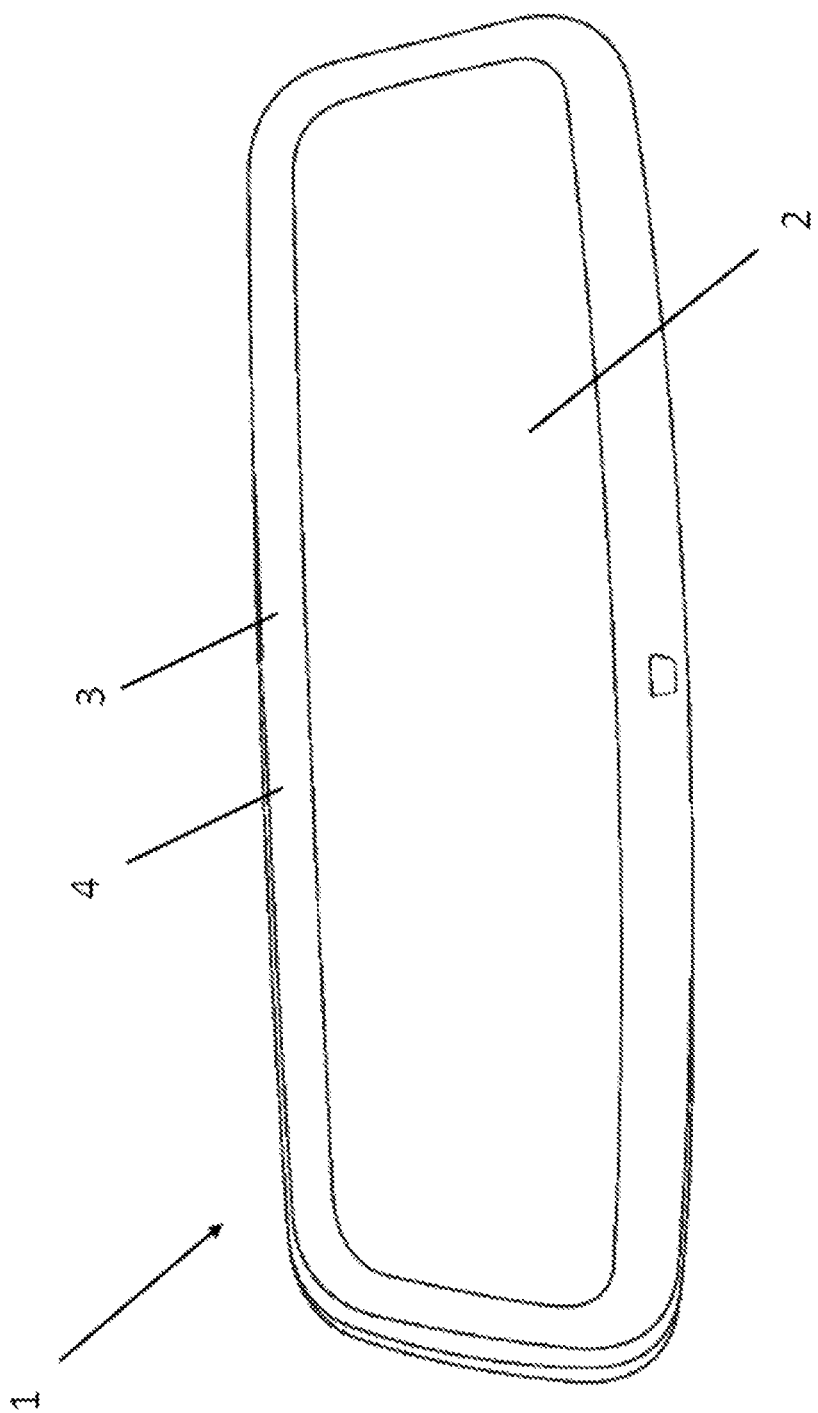
FIG. 1 illustrates a schematic, front view of a rear-view mirror arrangement as an interior mirror arrangement, in accordance with embodiments.

FIG. 1 illustrates a rear-view mirror arrangement 1 for incorporation into a motor vehicle in a schematic illustration in a front view. A mirror assembly 2 enabling the following traffic to be observed is held in a manner enclosed in a housing 3 in a first configuration. For this purpose, the housing 3 has a receptacle space having a receptacle opening toward the front. The housing 3 furthermore usually has a frame element 4, which fixes the mirror assembly 2 in a clamping fashion in the edge region during mounting. The housing 3 is usually fixable by way of a holding device/mirror base to the interior, i.e., to the vehicle roof lining or to the windshield of a motor vehicle. In addition, at least one light sensor is incorporated into the housing 3 and detects the light intensity of the surroundings from the direction of the following traffic. Furthermore, the light intensity of the front zone of the motor vehicle is detected. The mirror assembly 2 is then driven and dimmed depending on the measured signals. It goes without saying that the rear-view mirror arrangement 1 can also be embodied as an exterior mirror.

Figure 2:
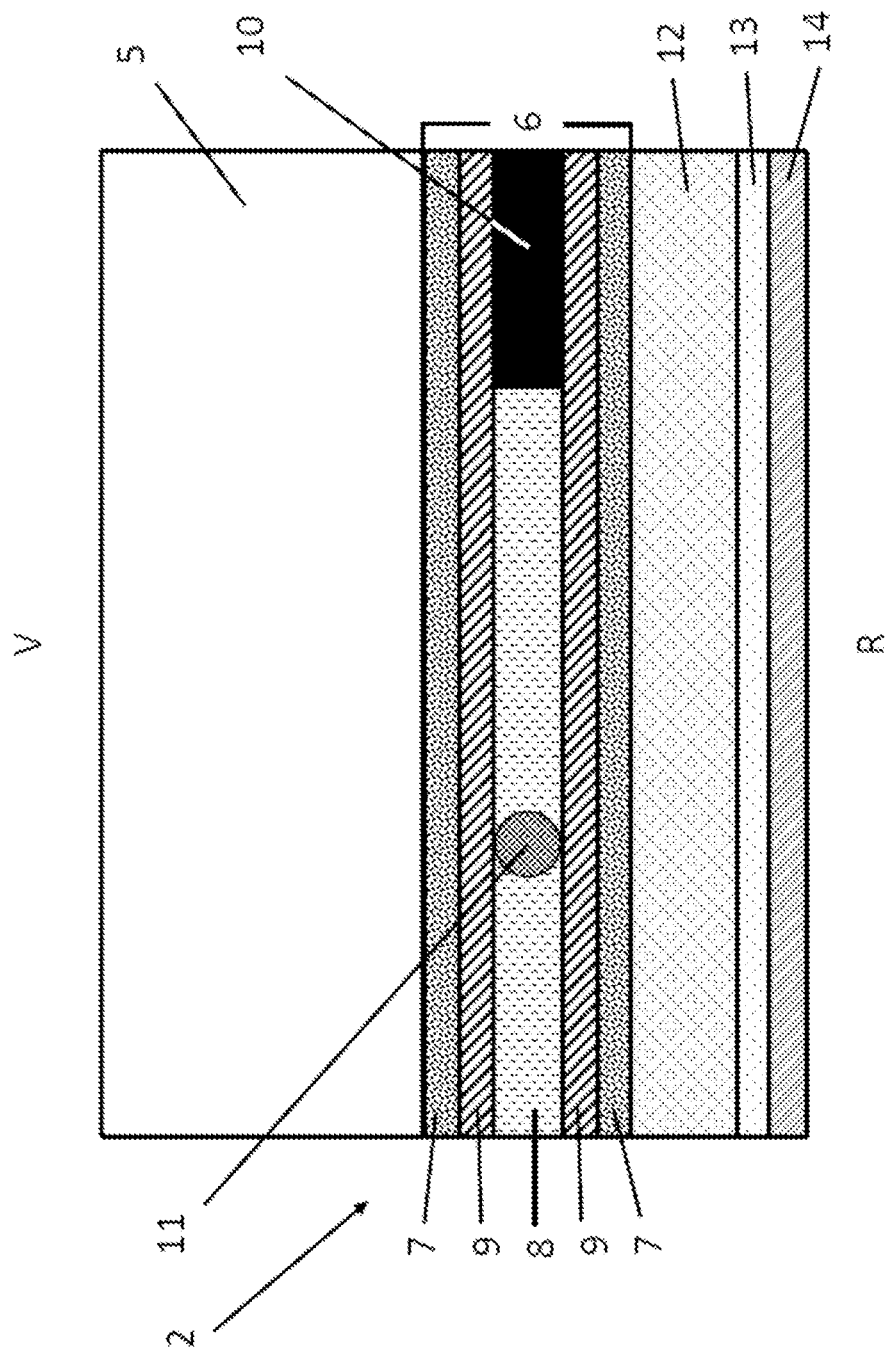
FIG. 2 illustrates a cross-sectional view of the layer construction of the mirror assembly, in accordance with embodiments.

As illustrated in FIG. 2, the layer construction of the mirror assembly 2 equipped with an automatic dimming function is described below with reference thereto. The sensors that detect the light intensity, the drive and evaluation electronics, are not illustrated or described in greater detail. The latter are known to the person skilled in the art from the prior art. The illustration of the layers is not depicted to scale, but rather only with regard to better identifiability. Overall, the layer thickness of the mirror assembly 2 in the example illustrated is approximately 2.2 mm. Of that the layer thickness of the transparent carrier layer 5 facing the front side V is approximately 2 mm. The layer thicknesses can also be embodied differently. In particular the carrier layer 5 having the function of anti-scratch protection can have a different layer thickness, in particular a smaller layer thickness.

For varying the reflectance, the mirror assembly 2 according to the invention comprises a liquid crystal cell 6, which forms the heart of the mirror assembly 2. It is embodied such that it is electrically drivable. This technology based on liquid crystals makes use of the effect that when an electric field is applied to the liquid crystal cell, the liquid crystal molecules are oriented parallel to the electric field. In the ground state, that is to say without an electric field, the liquid crystal molecules provided with color pigments are aligned in the longitudinal direction, i.e., passage direction of the light. In order to maintain this alignment, alignment layers are provided.

In this case, the liquid crystal cell 6 substantially includes the construction described herein. A liquid crystalline layer 8 is arranged in sealed fashion between two transparent electrically conductive layers 7. The contacting of these planar electrodes 7 is not illustrated. In this case, the electrically conductive layers 7 can be embodied as indium tin layer (IT) or indium tin oxide layer (ITO). Furthermore, a layer that brings about an alignment of the liquid crystal molecules in the ground state (in the absence of an applied electric field) is in each case provided between the electrically conductive layers 7 and the liquid crystalline layer 8. Such layers are designated as alignment layers 9, which are likewise configured in transparent fashion, and can consist of a polyimide. The liquid crystals of the liquid crystalline layer 8 are accommodated in sealed fashion between the alignment layers 9 by a circumferential seal 10 arranged marginally. The circumferential seal 10 can be attained by way of a marginally arranged ring-shaped layer of an adhesive material.

As is evident from FIG. 2, the liquid crystalline layer 8 comprises spacer elements 11 of circle configuration. In further embodiments, spacer elements having a different shape and configuration can also be used here.

The liquid crystal cell 6 described above is arranged between two transparent carrier layers 5, 12. As viewed from the front side V of the rear-view mirror arrangement, the transparent carrier layer 5 is embodied as a glass layer. The glass layer has the function of anti-scratch protection. A transparent plastic can also be used as a further material for the transparent carrier layer 5 arranged on the front side. On an opposite side R (side facing toward the inner side of the housing) relative to the liquid crystal cell 6, the transparent carrier layer 12 is embodied as a film. In this case, an optically transparent plastic film 12 preferably composed of a thermoplastic such as polyethylene terephthalate (PET), polycarbonate (PC) or polymethyl methacrylate (PMMA) is used as material for the film 12. The film 12 is provided with a non-transparent reflective layer 13 on the rear side thereof. In this case, the nontransparent reflective layer 13 can consist of a silver-, aluminum- or chromium-based coating. The layer 13 is produced, for example, by damper deposition or sputtering or spraying. Furthermore, an anti-corrosion protective layer 14 is preferably arranged in a terminating manner on the side facing toward the inner side of the housing.

The layer construction of the mirror assembly 2 proceeding from the front side of the rear-view mirror arrangement is listed in summary below:

Transparent carrier layer 5 (anti-scratch protection)
electrically conductive layer 7 (ITO, IT)
alignment layer 9 (PI)
liquid crystalline layer 8 (LC)
alignment layer 9 (PI)
electrically conductive layer 7 (ITO, IT)
transparent carrier layer 12 (optically transparent plastic film)
reflective layer 13
possibly anti-corrosion protective layer 14.

In a further embodiment (not illustrated), in contrast to the above-described embodiment of the mirror assembly 2, the reflective layer is embodied as a semi-transparent reflective coating. This enables the additional arrangement of a display arrangement on the rear side of the mirror assembly 2.

During the production of the mirror assembly 2, a first assembly and a second assembly are produced, as described in greater detail below. In a concluding manufacturing step, the marginal seal 10 and the liquid crystals 8 are applied to the first or second assembly. The two assemblies are then closed under vacuum in a manner free of blisters.

During the production of the first assembly, the electrically conductive layer 7 and the alignment layer 9 are produced on the transparent carrier plate 5 composed of glass or plastic facing the front side. This can likewise be carried out by vapor deposition, sputtering, spraying. In this case, the layers can be produced either successively, i.e., firstly the electrically conductive layer 7 and then the alignment layer 9, or in a common method step.

During the production of the second assembly, a reflective coating 13 is applied to the thermoplastic transparent film 12 in known methods by way of vapor deposition, spraying, sputtering. The electrically conductive layer 7 and the alignment layer 9 are then produced on the opposite side of the film 12. This can likewise be carried out by way of vapor deposition, sputtering, spraying. In this case, the layers can be produced either successively, i.e., firstly the electrically conductive layer 7 and then the alignment layer 9, or in a common method step.

What is claimed is:

1. A rear-view mirror arrangement for a motor vehicle, comprising:
    a housing; and
    a mirror assembly arranged on the housing for observing following traffic, and having:
        a front transparent carrier layer composed of an optically transparent plastic film and a rear transparent carrier layer composed of an optically transparent plastic film, and which faces toward the housing on a rear side thereof,
        at least one reflection coating provided directly on and contacting the rear transparent carrier layer, and
        an electrically-drivable liquid crystal cell arranged between the front transparent carrier layer and the rear transparent carrier layer, and which has a liquid crystalline layer arranged in a sealed fashion between transparent electrically conductive layers via a seal layer arranged substantially coplanar and circumferential at an upper surface and a bottom surface thereof with respect to the liquid crystalline layer, and a transparent alignment layer provided directly on and contacting the liquid crystalline layer and the seal layer between a respective one of the transparent electrically conductive layers and the liquid crystalline layer to align liquid crystal molecules of the liquid crystalline layer in a ground state.

2. The rear-view mirror arrangement of claim 1, wherein the at least one reflection coating comprises a silver, aluminum or chromium material.

3. The rear-view mirror arrangement of claim 1, wherein the electrically conductive layers comprise an indium tin layer or indium tin oxide layer.

4. The rear-view mirror arrangement of claim 1, wherein the optically transparent film comprises polyethylene terephthalate, or polycarbonate, or polymethyl methacrylate.

5. The rear-view mirror arrangement of claim 1, wherein the reflection coating comprises a semi-transparent reflective coating.

6. The rear-view mirror arrangement of claim 5, further comprising a display arrangement arranged between a rear side of the mirror assembly and the housing.

7. The rear-view mirror arrangement of claim 1, further comprising an anti-corrosion protective layer as a terminating layer on the rear side of the rear-view mirror arrangement.

8. The rear-view mirror arrangement of claim 1, wherein a reflectance of the mirror assembly is variable by a control device.

9. A mirror arrangement for a motor vehicle, comprising:
    a mirror assembly having:
        a front carrier layer composed of an optically transparent plastic,
        a rear carrier layer composed of an optically transparent plastic material,
        at least one reflection coating composed of a reflective metallic material, and which is arranged directly on and contacting the rear carrier layer,
        an electrically-drivable liquid crystal cell arranged between the front carrier layer and the rear carrier layer, the electrically-drivable liquid crystal cell having outer electrically conductive layers composed of a transparent, electrically conductive material, inner alignment layers composed of a transparent alignment material, and an innermost, liquid crystalline layer between the inner layers such that liquid crystal molecules of the liquid crystalline layer are aligned by the inner alignment layers in a ground state; and
        a seal layer arranged substantially coplanar and circumferential at an upper surface and a bottom surface thereof with respect to the innermost, liquid crystalline layer to seal the innermost, liquid crystalline layer between the inner layers, wherein the inner alignment layers, are provided directly on and contacting the liquid crystalline layer and the seal layer.

10. The mirror arrangement of claim 9, further comprising a housing for the mirror assembly.

11. The mirror arrangement of claim 9, wherein the optically transparent plastic material comprises polyethylene terephthalate, or polycarbonate, or polymethyl methacrylate.

12. The mirror arrangement of claim 9, wherein the reflective metallic material comprises a non-transparent silver material, or a non-transparent aluminum material, or a non-transparent chromium material.

13. The mirror arrangement of claim 9, wherein the transparent, electrically conductive material comprises indium tin or indium tin oxide.

14. The mirror arrangement of claim 9, wherein the transparent alignment material comprises a polyimide.

15. The mirror arrangement of claim 9, wherein the mirror assembly further comprises an anti-corrosion layer which terminates the mirror assembly on a rear side thereof.

16. A method for producing a rear-view mirror arrangement for a motor vehicle, the method comprising:
    producing a first assembly by providing a front transparent carrier layer composed of an optically transparent plastic film, coating the front, transparent carrier layer with a first electrically conductive layer, and arranging a first alignment layer on the first electrically conductive layer;

producing a second assembly by providing a rear, transparent carrier layer composed of an optically transparent plastic film, including applying at least one reflection coating directly on and contacting the rear, transparent carrier layer, coating the rear, transparent carrier layer with a second electrically conductive layer on an opposite side of the rear, transparent carrier layer, and arranging a second alignment layer on the second electrically conductive layer;

arranging, in a circumferential fashion, a seal layer to the coated surface of the first assembly or the second assembly, and also a liquid crystalline layer sealed within a sealed region by the seal layer, wherein the seal layer is arranged substantially coplanar and circumferential at an upper surface and a bottom surface thereof with respect to the liquid crystalline layer such that the first alignment layer and the second alignment layer are respectively provided directly on and contacting the liquid crystalline layer and the seal layer; and then connecting the first assembly and the second assembly under a vacuum.

\* \* \* \* \*